G. C. Choate,

Shovel Handle.

No. 101,711.   Patented Apr. 12, 1870.

Witnesses:
A. W. Almquist
Alex. T. Roberts

Inventor:
Geo. C. Choate
per Munn & Co
Attorneys.

UNITED STATES PATENT OFFICE.

GEORGE C. CHOATE, OF WYOMING STATION, WYOMING TERRITORY.

IMPROVEMENT IN SHOVEL-HANDLES.

Specification forming part of Letters Patent No. 101,711, dated April 12, 1870.

*To all whom it may concern:*

Be it known that I, GEORGE C. CHOATE, of Wyoming Station, Albany county, in the Territory of Wyoming, have invented a new and useful Improvement in Shovel-Handles; and I do hereby declare that the following is a full, clear, and exact description thereof, which will enable others skilled in the art to make and use the same, reference being had to the accompanying drawings, forming part of this specification.

Figure 1:
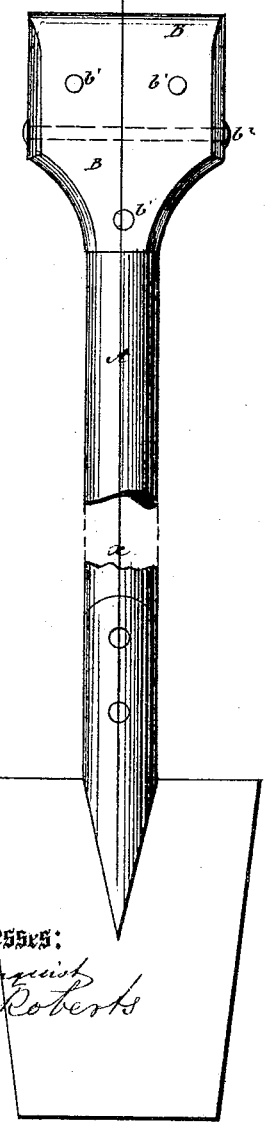
Figure 2:
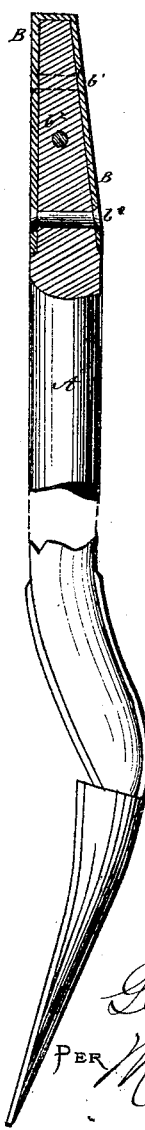

Figure 1 is a side view of a part of a shovel-handle, illustrating my improvement. Fig. 2 is a detail sectional view of the same, taken through the line $x\ x$, Fig. 1.

Similar letters of reference indicate corresponding parts.

My invention has for its object to furnish an improved shovel-handle which shall be so constructed and arranged that its ends may be used as a tamping-iron or rammer in leveling and raising railroad-ties, in setting fence-posts and telegraph-poles, and for other purposes where a shovel and rammer are both required; and it consists in forming a rammer upon the end of a shovel-handle, as hereinafter more fully described.

A represents the handle of a long-handled or dirt shovel. The end of the handle A is made broad, as shown in Fig. 1, and somewhat tapering, as shown in Fig. 2. The side edges of the broad part or rammer B are covered with an iron plate, which should be made thicker upon and near the end of the rammer, and the edges of which should be turned down over the beveled edges of the wooden part of said rammer. The iron plate is secured to the wooden part of the rammer by rivets $b'$ passing through the said iron plate and through the wooden part of said rammer, as shown in Figs. 1 and 2, and the wooden part of the rammer is guarded against splitting by one or more rivets, $b^2$, passed through said wooden part from edge to edge, as shown in Figs. 1 and 2.

Having thus described my invention, I claim as new and desire to secure by Letters Patent—

A shovel-handle covered at one end with a metal plate, in the manner shown and described.

The above specification of my invention signed by me this 1st day of November, 1869.

GEORGE C. CHOATE.

Witnesses:
P. H. BYRON,
I. A. PEASE.